United States Patent [19]
Minakuchi

[11] Patent Number: 5,883,657
[45] Date of Patent: Mar. 16, 1999

[54] SYNCHRONIZING SIGNAL GENERATING CIRCUIT FOR OPTICAL MULTIPLE-SCANNING DEVICE

[75] Inventor: Tadashi Minakuchi, Tokyo, Japan

[73] Assignee: Asahi Kogaku Kogyo Kabushiki Kaisha, Tokyo, Japan

[21] Appl. No.: 722,621

[22] Filed: Sep. 27, 1996

[30] Foreign Application Priority Data

Sep. 29, 1995 [JP] Japan .................................. 7-274980

[51] Int. Cl.⁶ ..................................................... H04N 1/16
[52] U.S. Cl. ......................... 347/235; 347/234; 347/248; 347/250; 358/409
[58] Field of Search ................................... 347/235, 248, 347/250, 249, 234, 247, 225, 229; 250/214 R; 358/409, 466

[56] References Cited

U.S. PATENT DOCUMENTS

| 5,444,239 | 8/1995 | Nacman et al. ......................... 250/235 |
| 5,450,120 | 9/1995 | Nishio ..................................... 347/249 |

FOREIGN PATENT DOCUMENTS

| 0250132 | 6/1987 | European Pat. Off. . |
| 0250132 | 12/1987 | European Pat. Off. . |
| 54-82248 | 6/1979 | Japan . |

*Primary Examiner*—N. Le
*Assistant Examiner*—Hai C. Pham
*Attorney, Agent, or Firm*—Greenblum & Bernstein, P.L.C.

[57] ABSTRACT

An optical multiple-scanning device has a number of scanning laser light beams that scan along a scan path, are separated along the scan path by a predetermined pitch P, and produce an illumination spot of diameter D along the scan path. A synchronizing signal generating circuit for the optical multiple-scanning device includes a single photodiode and a signal processing circuit. The single photodiode has a width W along the scan path and generates a signal with maximums IMAX and minimums IMIN. If the condition $W \leq P-D/4$ is met, or if IMIN is less than or equal to 80% of IMAX, the signal processing circuit accurately generates a square-wave synchronizing signal such that successive rectangular pulses of the synchronizing signal cyclically indicate that successive scanning laser beams have reached a predetermined position along the scan path.

11 Claims, 8 Drawing Sheets

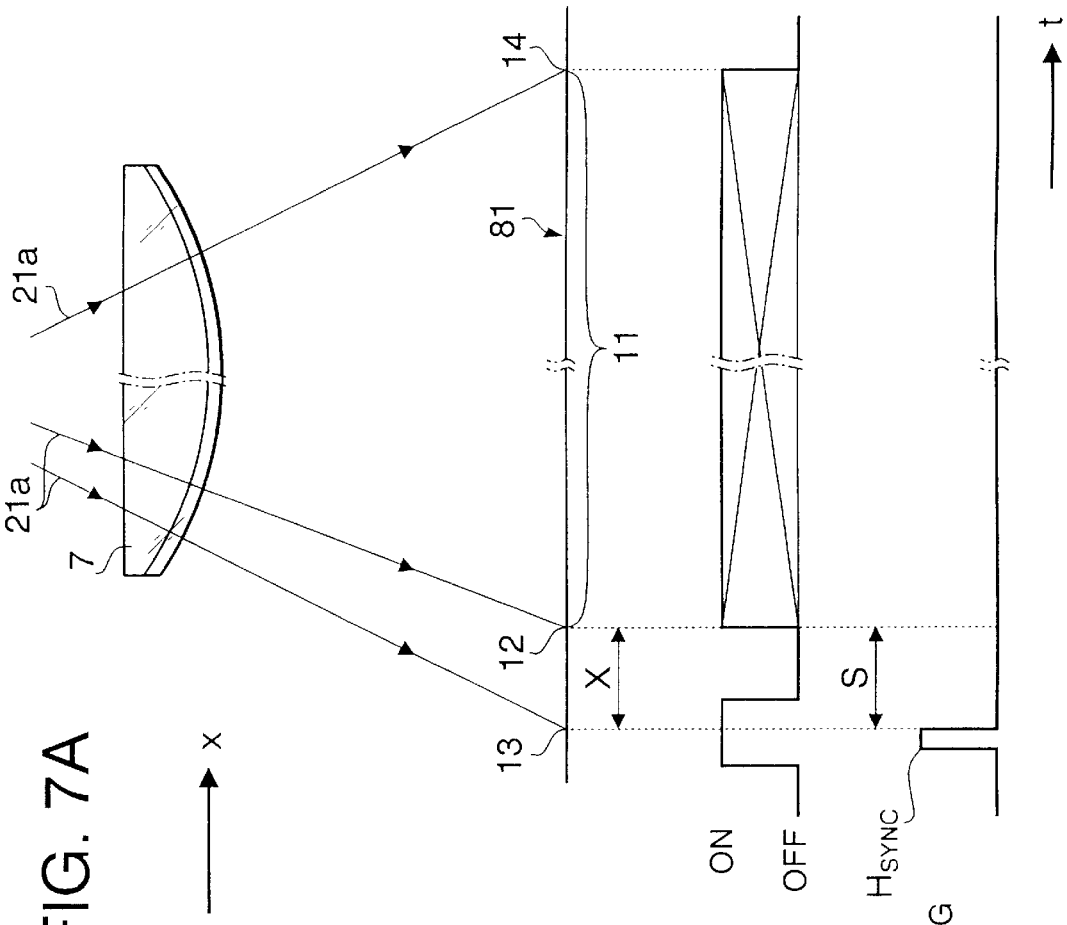

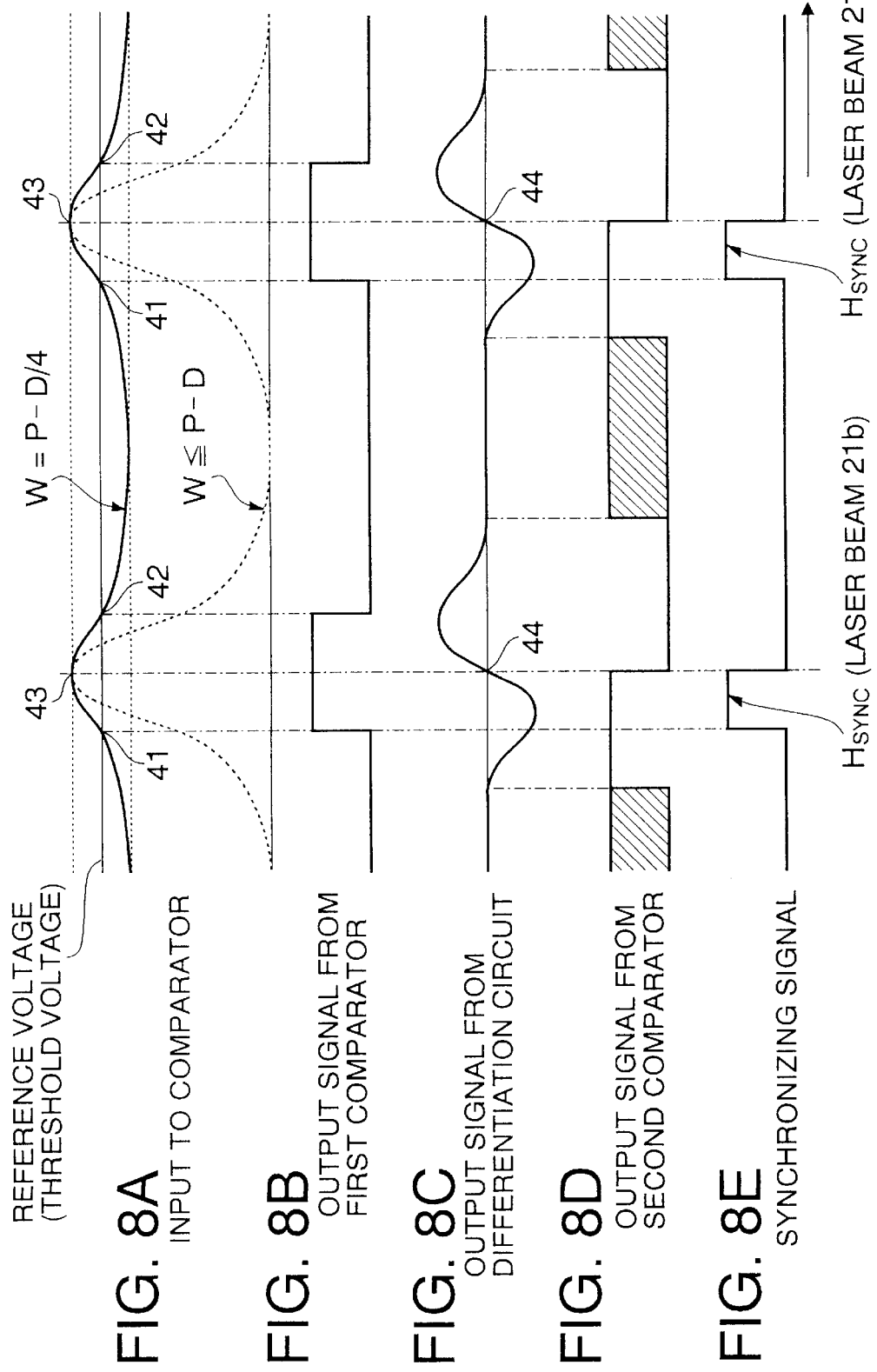

SYNCHRONIZING SIGNAL GENERATING CIRCUIT FOR OPTICAL MULTIPLE-SCANNING DEVICE

BACKGROUND OF THE INVENTION

The present invention relates to a synchronizing signal generating circuit used in an optical scanning device, and specifically, to an optical scanning device for emitting a plurality of laser beams which scan simultaneously. Optical scanning devices are typically included in laser beam printers, facsimile devices, or the like.

In a conventional optical scanning device, a plurality of laser beams are emitted from a light source (for example, a plurality of laser diodes) and are deflected and scanned in a predetermined angular range (deflection angle) and direction by a rotating polygonal mirror. The laser beams pass through an fθ lens that causes the laser beams to scan at a constant speed along scan paths, which are parallel, in a predetermined scan plane. The movement of the laser beams through the deflection angle in the scan plane is referred to as a main scan.

If the optical scanning device is used in, for example, a laser beam printer, a uniformly charged photoconductive surface (light receiving surface) of a rotatable photoconductive drum is the target to be scanned. During each main scan, the laser beams pass along the photoconductive surface. A predetermined image area on the photoconductive surface is scanned by the laser beams which are optically modulated (i.e. turned on and off), respectively, according to image data that is received from an external source, such as a personal computer. The photoconductive drum is rotated in synchronization with the main scan. The rotation of the photoconductive drum is referred to as a sub scan. When the laser beams hit the uniformly charged photoconductive surface they form an electrostatic latent image, corresponding to the image data received, on the photoconductive surface.

As the photoconductive drum is rotated, toner is adhered to the electrostatic latent image, in a pattern corresponding to the electrostatic latent image, forming a toner image. Then, as the photoconductive drum is further rotated, the toner image is transferred to and fixed on a recording sheet.

The image area is delineated by an image start position and an image end position for each laser beam that are located near opposite ends of the photoconductive drum. A synchronizing signal $H_{SYNC}$ (horizontal synchronizing signal) is used to synchronize the image start position so that it is the same for each laser beam and for each main scan. That is, the synchronizing signal $H_{SYNC}$ synchronizes the position at which the image data transfer starts for each laser beam, and thus, synchronizes the position on the recording paper at which the toner image transfer starts. It is important that the image start position remain consistent for each laser beam and for each main scan in order to produce accurate printing.

In a conventional optical scanning device, a photodiode is positioned at a synchronizing position that is on the main scan path but outside the image area at a predetermined distance from the image start positions. The laser beams are turned on while passing over the synchronizing position such that the photodiode outputs a signal. The synchronizing signal $H_{SYNC}$ is generated based on the signal output from the photodiode and the start positions for the image area are those positions reached by the laser beams a predetermined amount of time after the synchronizing signal $H_{SYNC}$.

In conventional optical scanning devices which emit a plurality of scanning beams and which use a photodiode to detect the laser beams, it is difficult to generate the synchronizing signal $H_{SYNC}$ for each laser beam accurately.

SUMMARY OF THE INVENTION

It is therefore an object of the present invention to provide a synchronizing signal generating circuit which, using simple components, enables the generation of high accuracy synchronizing signals for a plurality of laser beams in an optical multiple-scanning device.

The synchronizing signal generating circuit according to the invention is provided in an optical multiple-scanning device. The optical multiple-scanning device includes a plurality of scanning light beams that scan in a predetermined direction along a scan path.

Each of the plurality of scanning light beams has an illumination spot of diameter D (that is, each scanning light beam creates an illumination spot of diameter D when striking a surface that is at a predetermined distance). Further, each of the plurality of scanning light beams is offset from adjacent light beams by a pitch P along the scan path.

In one preferred embodiment, the synchronizing signal generating circuit includes a light receiving element and a signal processing circuit.

The light receiving element (in a particular case, a photodiode) has a width W along the scan path. The light receiving element is responsive to light received from the scanning light beam such that, when the scanning light beam contacts the light receiving element, the light receiving element generates a light receiving element signal. The light receiving element signal has a periodic maximum output IMAX and a periodic minimum output IMIN.

The signal processing circuit receives the light receiving element signal and in response generates a square-wave synchronizing signal such that successive rectangular pulses cyclically indicate that successive scanning light beams have reached a predetermined position along the scan path.

In order for the synchronizing signal generating device to accurately generate successive rectangular pulses, the width W is set, in relation to the pitch P and the diameter D, to satisfy the following condition (1):

$$W \leq P - D/4 \quad (1).$$

Alternatively, the width W of the light receiving element is set such that the periodic minimum output IMIN of the light receiving element signal is less than or equal to 80% of the periodic maximum output IMAX, and preferably less than or equal to 75% of the periodic maximum output IMAX.

In a specific case, the signal processing circuit generates a leading edge of said successive rectangular pulses based on said light receiving element signal and generates a trailing edge of said successive rectangular pulses based on a differential of the light receiving element signal with respect to time.

In a more specific case, the signal processing circuit generates the leading edge of said successive rectangular pulses upon comparing said light receiving element signal with a reference voltage signal that is set between said maximum output IMAX and said minimum output IMIN, and the signal processing circuit generates the trailing edge of said successive rectangular pulses when the differential of the light receiving element signal with respect to time intersects the time axis.

As has been described above, the synchronizing signal generating circuit according to the invention generates an accurate synchronizing signal which accurately indicates when each of the scanning light beams reaches a predetermined position along the scan path. Further, in the case where the synchronizing signal generating circuit is applied to an optical multiple-scanning device in a laser beam printer, the image start position will be consistent for each of the scanning laser beams and for each main scan, giving accurate plotting (printing) quality.

Further, the synchronizing signal generating circuit according to the invention is easily manufactured using a single conventional photodiode.

BRIEF DESCRIPTION OF THE DRAWINGS

FIGS. 7A, 7B and 7C are, respectively, a schematic view and two timing charts showing the relationship between the main scan of a laser beam and the generation of a synchronizing signal; and FIGS. 8A through 8E are timing charts showing the operation of the synchronizing signal generating circuit according to the invention.

DETAILED DESCRIPTION OF THE PREFERRED EMBODIMENTS

Figure 1:
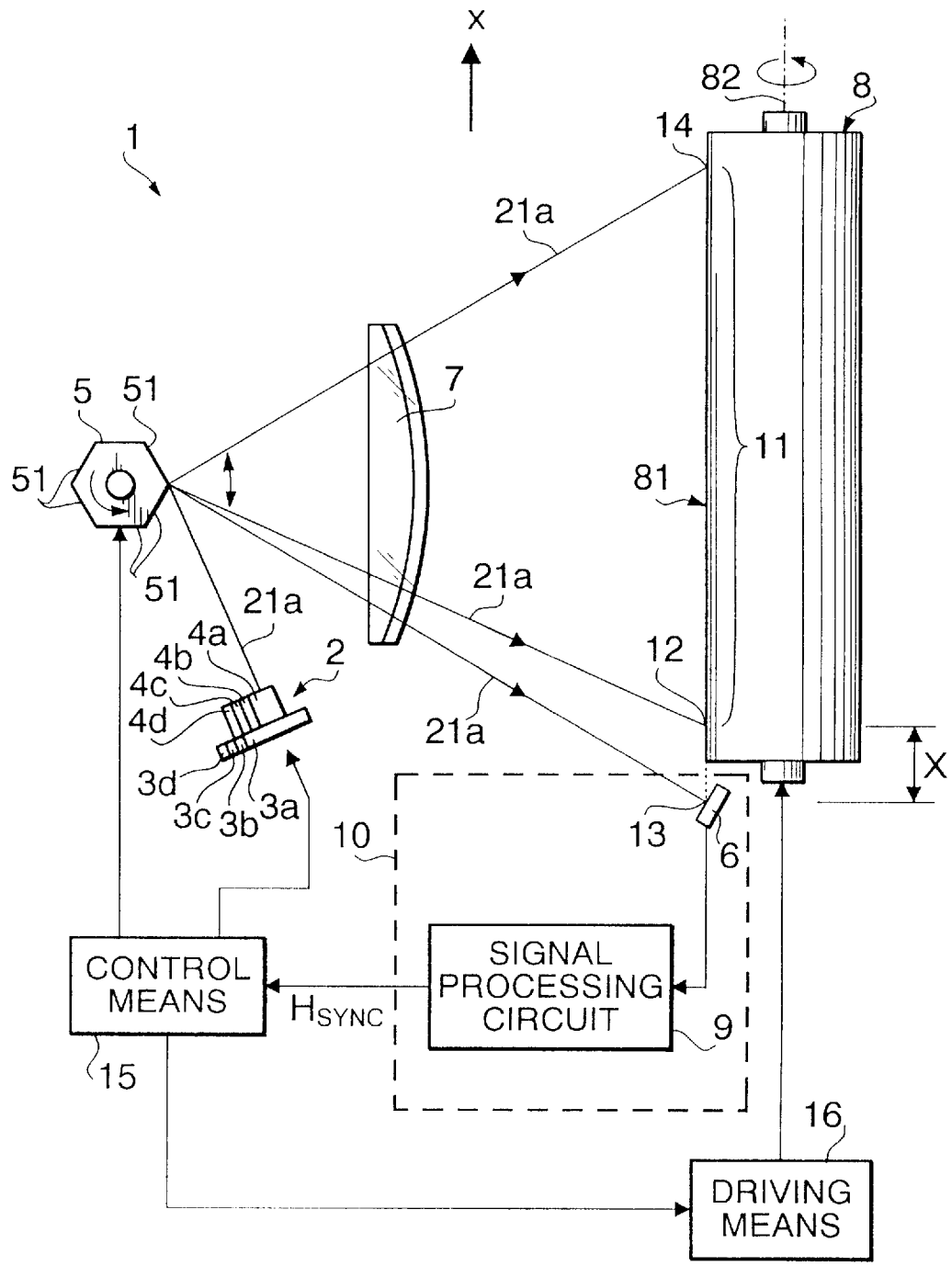
FIG. 1 is a plan view of an embodiment of a synchronizing signal generating circuit for an optical multiple-scanning device as applied to a laser printer.

FIG. 1 is a plan view of an optical multiple-scanning device 1 including an embodiment of a synchronizing signal generating circuit employed in a laser printer.

As shown in FIG. 1, an optical multiple-scanning device 1 includes a light source 2, a rotating polygonal mirror 5, an fθ lens 7, a scan plane (in this case a photoconductive drum 8), and a synchronizing signal generating circuit 10.

The light source 2 includes a predetermined number of laser light sources 3a–3d, for example, four semiconductor lasers, and an equal number of optical systems 4a–4d.

Figure 2:
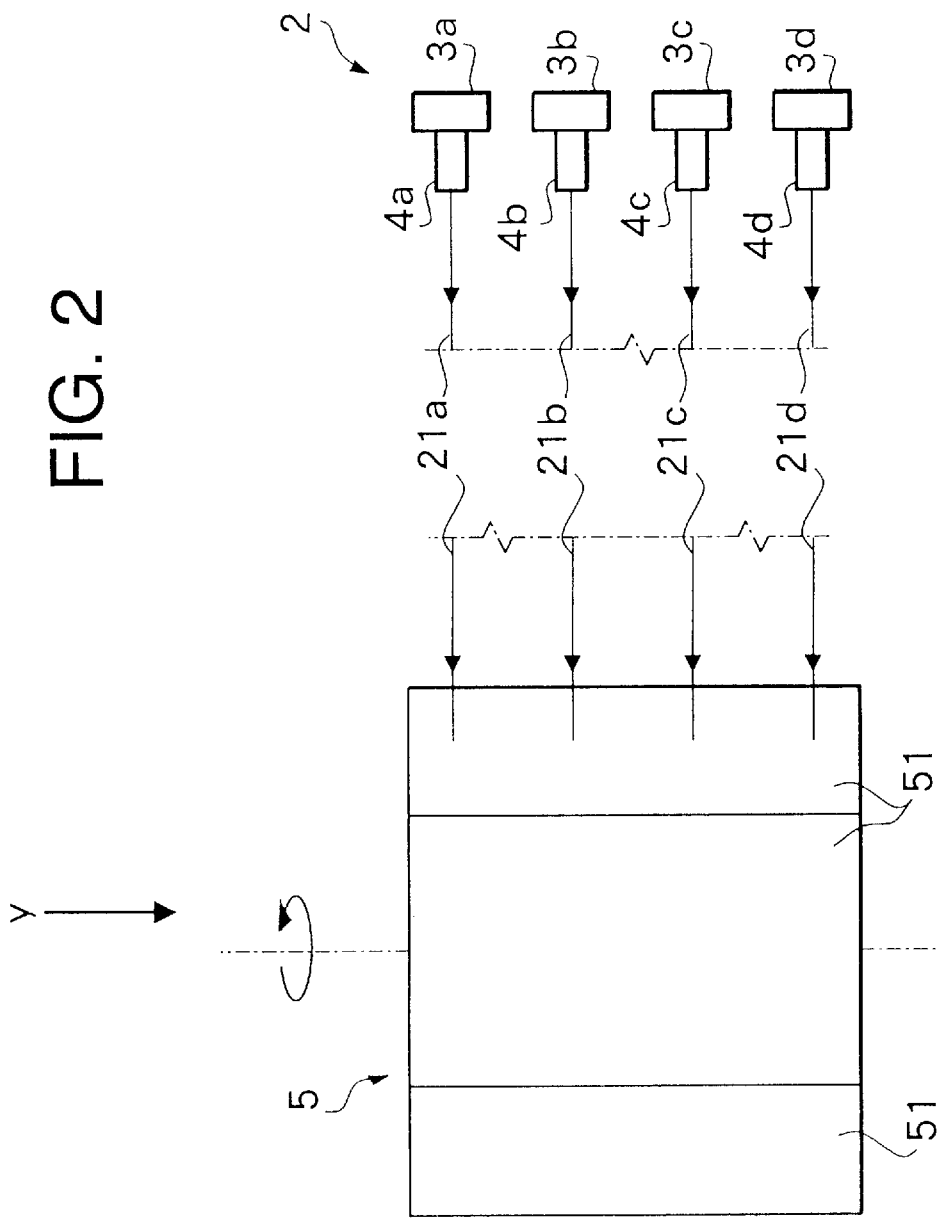
FIG. 2 is a side view of light sources and a polygonal mirror.

FIG. 2 is a side view of the laser light sources 3a–3d and the polygonal mirror 5. The laser light sources 3a–3d are arranged such that they generate separate laser beams 21a–21d arranged along an axis parallel to the rotation axis of the polygonal mirror 5. Each of the optical systems 4a–4d includes, for example, a collimating lens and a condenser lens (not shown), and is mounted at the light emitting side of the corresponding laser light sources 3a–3d. The optical systems 4a–4d separately converge each of the laser beams 21a–21d onto a reflecting surface 51 of the polygonal mirror 5.

The polygonal mirror 5 is rotatable, is formed as a regular polygon, and has, for example, six reflecting surfaces 51 formed on its outer periphery. Each reflecting surface 51 is a flat reflecting surface, having, for example, a vapor-deposited aluminum layer. Each reflecting surface 51 is formed at a predetermined angle (in this example, 120°) with respect to adjacent reflecting surfaces 51.

Again referring to FIG. 1, the optical multiple-scanning device 1 further includes a control circuit 15, such as a microcomputer, or the like, and a driving unit 16, such as a motor and gear system. The control circuit 15 controls the rotation of the polygonal mirror 5 and the driving unit 16.

As shown in FIG. 1, the laser beams 21a–21d from the light source 2 are reflected by the reflecting surfaces 51 of the polygonal mirror 5 (only the path of the laser beam 21a is shown). The rotation of the polygonal mirror 5 (in this case counter-clockwise and at a constant speed) changes the angle of incidence of each of the laser beams 21a–21d on the reflecting surface 51 and the laser beams 21a–21d are deflected and scanned within a predetermined angular range. The angular range through which the laser beams 21a–21d (scanning light beams) are scanned is referred to as the deflection angle.

The fθ lens 7 is placed such that it covers the deflection angle and acts on the laser beams 21a–21d so that the angular scanning velocity that the laser beams 21a–21d have when they are reflected by the polygonal mirror 5 is converted to a constant horizontal scanning velocity in a scan plane. In a laser printer, the scan plane is substantially formed by a charged photoconductive surface (image forming surface) 81 of the photoconductive drum 8. The fθ lens 7 also compensates for any tilting of the reflecting surfaces 51 of the polygonal mirror 5.

After passing through the fθ lens 7, the laser beams 21a–21d scan at a constant horizontal velocity along the charged photoconductive surface 81. For each rotation of the polygonal mirror 5 by 60°, the laser beams 21a–21d are deflected once through the deflection angle and the laser beams 21a–21d are thus scanned (main scanned) once along the charged photoconductive surface 81, parallel to a rotation axis 82 of the photoconductive drum 8.

During a predetermined part of each main scan, the control circuit 15 controls the laser light sources 3 to turn the laser beams 21a–21d on and off in response to image data received from an external source (not shown) such as a personal computer. Thus, during each main scan an electrostatic latent image (corresponding to the image data) is formed at the points of contact (referred to as dots) between the laser beams 21a–21d and the charged photoconductive surface 81.

For every main scan of the laser beams 21a–21d, a sub scan is also performed by rotating the photoconductive drum 8 by a predetermined amount in a predetermined direction. The control circuit 15 instructs the driving unit 16 to rotate the photoconductive drum 8 by an amount equal to the size of the contact made by the laser beams 21a–21d on the photoconductive surface 81, in this example, four dots.

Thus, each time the polygonal mirror 5 rotates by 60°, a main scan and a four-dot sub scan are performed and one full rotation of the polygonal mirror 5 results in 6 main scans and 6 sub scans that correspond to the plotting of twenty-four dots in the sub scan direction.

As the photoconductive drum 8 rotates, toner (not shown) is applied to the photoconductive surface 81 and adheres in correspondence to the electrostatic latent image, creating a toner image. The toner image is then transferred to and fixed on recording paper (not shown).

Also as shown in FIG. 1, the deflection angle covers, for each of the laser beams 21a–21d, a synchronizing position 13 and an image area 11, both located on the scan plane. The synchronizing position 13 is beside the image area 11 at the start of the main scan path. The image area 11 is on the photoconductive surface 81 of the photoconductive drum 8 and includes an image start position 12 and an image end position 14 at opposite ends of the photoconductive drum 8. The image start position 12 is the predetermined position at which the optical modulation of the laser light sources 3 based on the image data starts. The image end position 14 is the position at which the optical modulation of the laser light sources 3 based on the image data ends. The synchronizing position 13 is located a predetermined distance X from the image start position 12.

It is important that the image start position 12 be consistent in the sub scan direction in order to produce accurate printing. In order to keep the image start position 12 consistent, the synchronizing signal generating circuit 10 generates a synchronizing signal $H_{SYNC}$ (horizontal synchronizing signal) that determines the image start position 12 for each main scan. In a system using four laser light sources 3 it is particularly important to also synchronize each of the laser light beams 21a–21d with regard to their image start positions 12.

In order to generate the synchronizing signal, the synchronizing signal generating circuit 10 includes a photodiode 6 (light receiving element) and a signal processing circuit 9. The photodiode 6 is connected to the signal processing circuit 9 and the signal processing circuit 9 is also connected to the control circuit 15.

Figure 3:
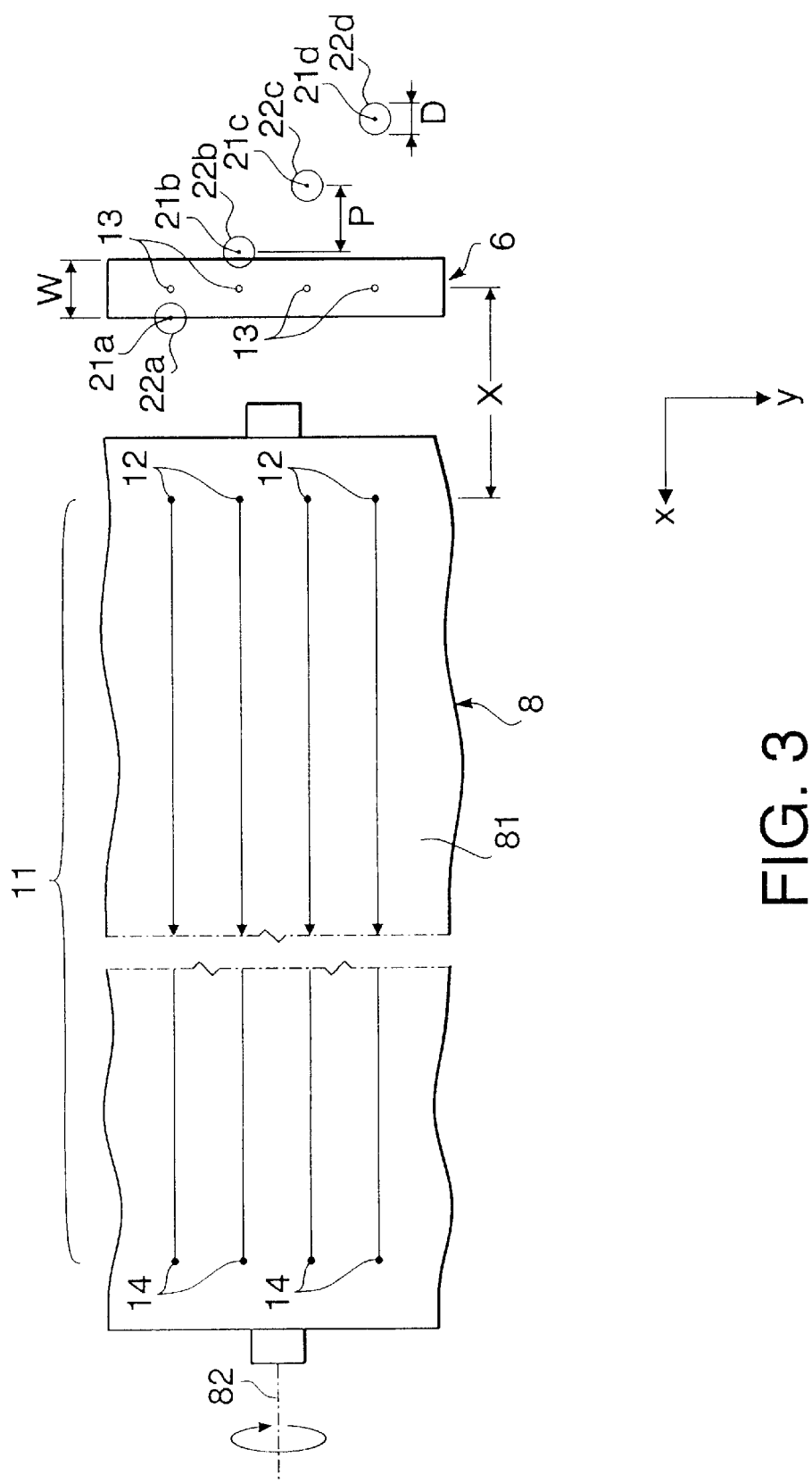
FIG. 3 is a side view of a photoconductive drum and a light receiving element (photodiode)

FIG. 3 is a side view of the photoconductive drum 8 and the photodiode 6.

As shown in FIG. 3, the photodiode is positioned with its center at the synchronizing positions 13, a predetermined distance X from the image start positions 12.

Also, each of the laser beams 21a–21d is designed to be offset from the adjacent laser beams by a predetermined pitch (P) in the main scan direction. That is, the illumination spots 22a–22d of the laser beams 21a–21d are offset from each other with respect to the main scan direction (x axis) by the pitch P. Thus, for example, illumination spot 22b lags illumination spot 22a during the main scan by an amount corresponding to the pitch P, and similarly, illumination spot 22c lags illumination spot 22b, and illumination spot 22d lags illumination spot 22c.

Referring to FIG. 3, the pitch P is more particularly defined as the distance between the centers of adjacent laser beams in the main scan direction (x-axis direction). If the pitches between adjacent laser beams in the main scan direction differ, the minimum of such pitches is set as the pitch P.

Further, the diameter D is defined as the diameter of each illumination spot 22a–22d. In the optical multiple-scanning device 1, an illumination spot is defined as an area in which the light intensity level of any point in the area is greater than $1/e^2$ times the peak (illumination spot center) of the laser beam (where e is the base of the natural logarithms). The laser beam is a Gaussian beam, and therefore at any point in the illumination spot, the intensity level is greater than 13.5% of the peak level. Alternatively, the illumination spot may be defined as an area in which the intensity level at any point therein is greater than 1/e of the peak level. In another alternative arrangement, the illumination spot may be defined as an area in which the intensity level at any point therein is greater than half of the peak level. If the calculated diameters differ among laser beams, the maximum diameter is set as the diameter D.

Still further, a width W is defined as the width of an effective light receiving area of the photodiode 6 in the main scan direction, where the "effective light receiving area" refers to the area on the photoconductive surface in which light can be received and in which photoelectric conversion of the received light is performed.

In the sub scan direction, the size of the effective light receiving area of the photodiode 6 is set to be adequate for receiving all of laser beams 21a–21d.

In the embodiment, the relationship among the pitch P, the diameter D, and the width W is set such that the generation of the synchronizing signals $H_{SYNC}$ corresponding to each of the laser beams 21a–21d can be performed independently by the single photodiode 6.

Specifically, the pitch P, the diameter D, and the width W are set so as to satisfy the following condition (1):

$$W \leq P - D/4 \qquad (1).$$

FIG. 5A is a light intensity graph and FIG. 5B is a schematic diagram showing the photodiode 6. FIG. 6 is a graph showing the signal output from the photodiode 6.

Figure 5:
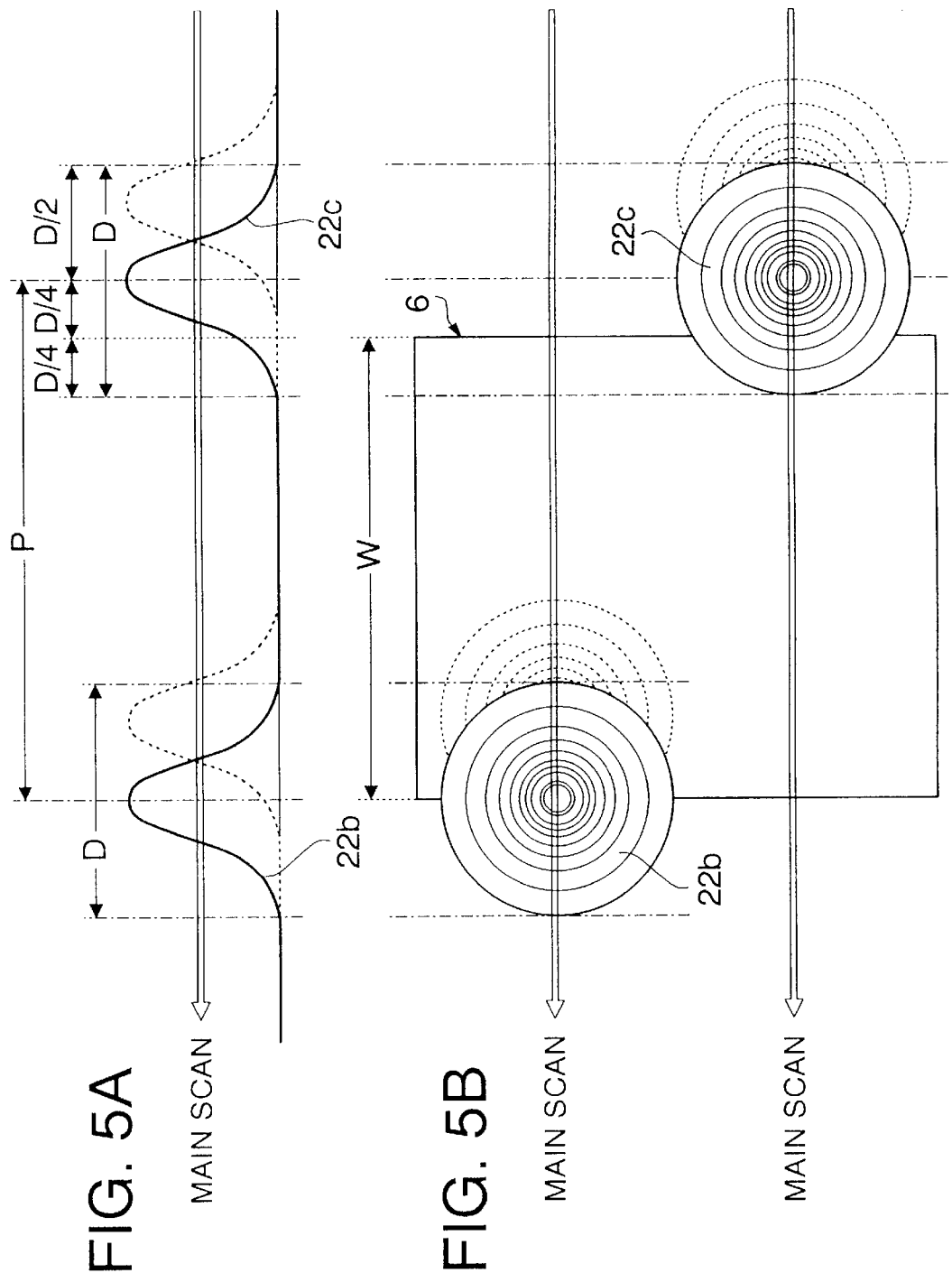
FIGS. 5A and 5B are, respectively, a graph showing the light intensity of two scanning laser beams and a view showing a photodiode and two scanning laser beams.
Figure 6:
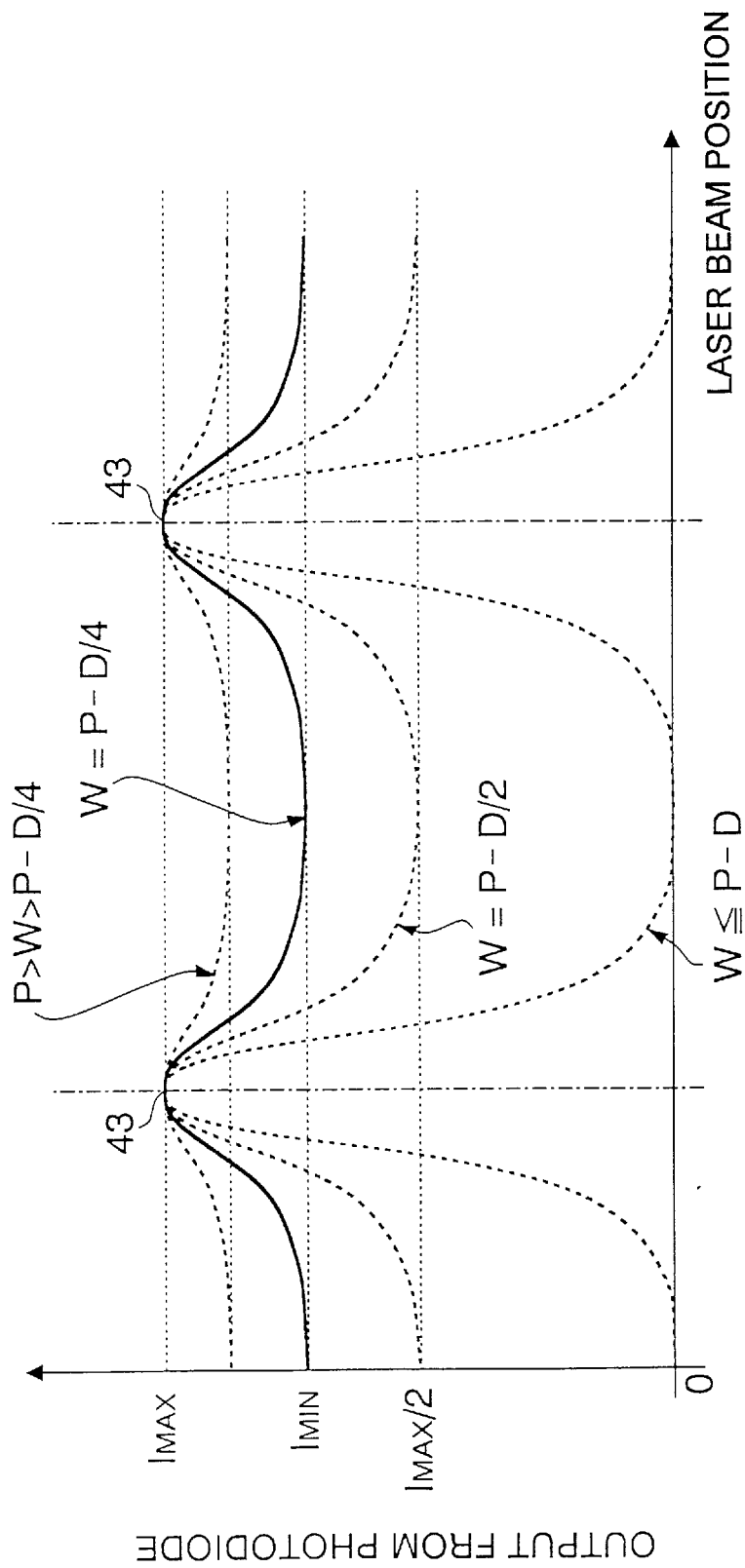
FIG. 6 is a graph showing the signal output from the photodiode.

As shown in FIGS. 5A and 5B, the width W is set equal to P–D/4 in the present embodiment. FIGS. 5A and 5B show, for example, the light intensities and positions of the illumination spots 22b and 22c as they pass over the photodiode 6. FIG. 6 shows the output from photodiode 6 from when the laser beam 21b (illumination spot 22b) passes the right side of the effective light receiving area of the photodiode 6 (FIG. 5) until the laser beam 21c (illumination spot 22c) passes the left side of the effective light receiving area of the photodiode 6 (FIG. 5). Curves are shown for the current case where W=P–D/4, and for the cases where W=P–D/2, W≦P–D, and P>W>P–D/4 (for comparison).

In FIG. 6, "IMAX" and "IMIN" indicate the maximum value (peak value) and the minimum value of the output (output signal) from the photodiode 6, respectively, for the condition W=P–D/4. During the main scan, illumination spots 22a–22d of laser beams 21a–21d successively fall fully within the effective light receiving area of the photodiode 6 and IMAX is output from the photodiode 6 each time this occurs.

By thus setting the width W of the effective light receiving area of the photodiode 6 in the main scan direction to satisfy the above condition (1), the minimum value IMIN of the output from the photodiode 6 will be 80% or less of the maximum value IMAX. Preferably, the minimum value IMIN is set to be 75% or less of the maximum value IMAX. Thus, each peak point 43 can be detected accurately by, for example, using a reference voltage. Further, as will be described later, since each peak point 43 serves to generate the trailing edge of the synchronizing signals $H_{SYNC}$ corresponding to the respective laser beams 21b–21d, the generation of synchronizing signals $H_{SYNC}$ corresponding to each of the laser beams 21b–21d and, in particular, the generation of the timing of the trailing edge of each synchronizing signal $H_{SYNC}$ can be performed accurately.

Figure 4:
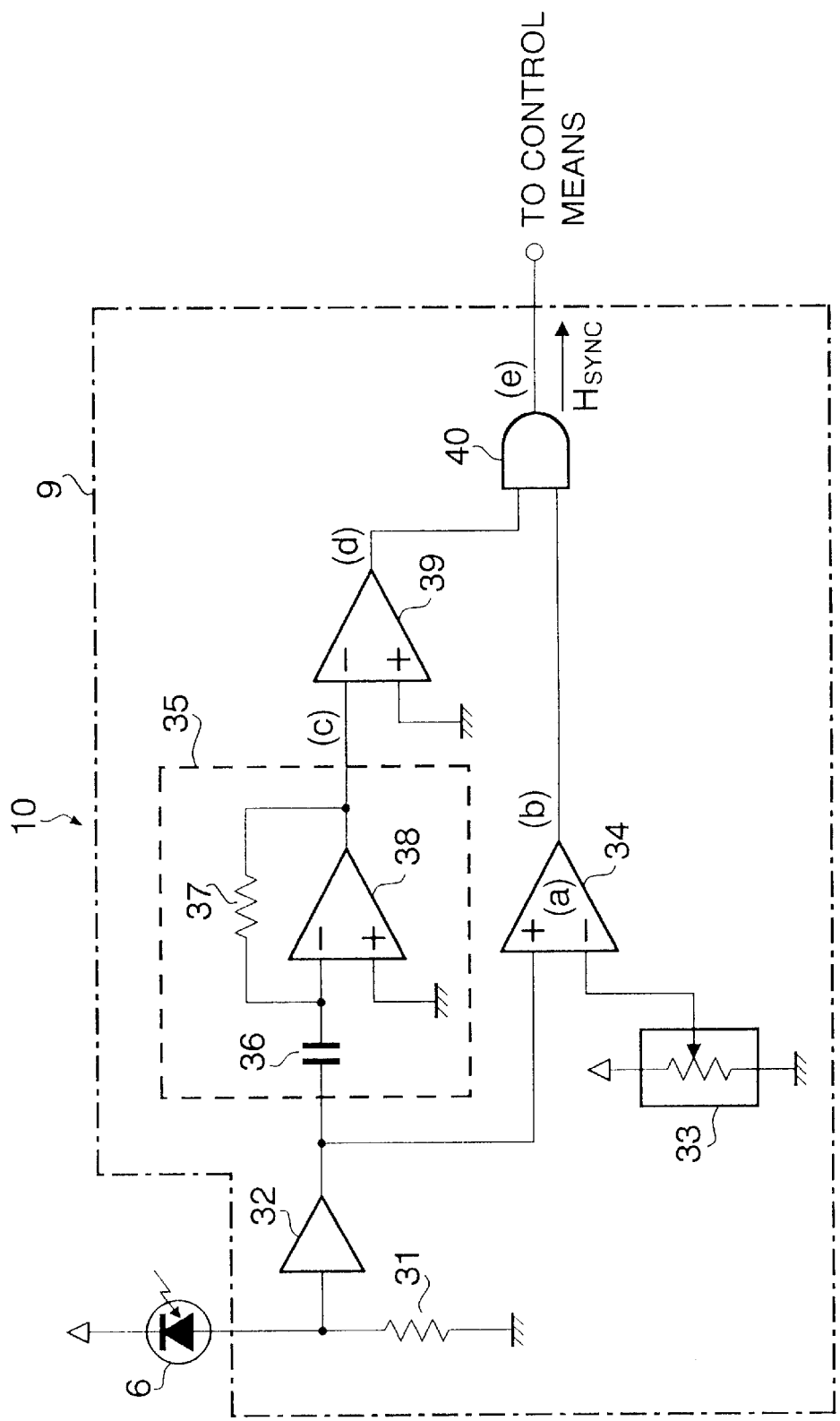
FIG. 4 is a circuit diagram for a synchronizing signal generating circuit according to the invention.

The signal processing circuit 9 is shown in detail in FIG. 4. The signal processing circuit 9 includes a resistance (resistor) 31, an amplifier 32, a reference voltage generator 33, a first comparator 34, a differentiation circuit 35, a second comparator 39, and a logical AND circuit 40.

The photodiode 6 is connected to the input of the signal processing circuit 9. Within signal processing circuit 9, the grounded resistance (resistor) 31 serves as a load circuit for the photodiode 6, and the output of the resistance 31, that is, the connection point between the photodiode 6 and the resistance 31, is connected to the amplifier 32.

The output of the amplifier 32 is connected to both the differentiation circuit 35 and the positive input terminal of the first comparator 34.

The negative input terminal of the first comparator 34 is connected to the reference voltage generator 33 and the reference voltage generator 33 is set to apply a predetermined reference voltage (threshold voltage).

The differentiation circuit 35 is comprised of a capacitance (capacitor) 36, a resistance (resistor) 37, and a differential amplifier 38. In the present case, the capacitor 36 is located at the input (i.e. connected to the output of the amplifier 32) and connected to the negative input terminal of the differential amplifier 38. One end of the resistor 37 is connected to a point between the capacitor 36 and the negative input terminal of the differential amplifier 38 while the other end is connected to the output of the differential amplifier 38 (which is also the output of the differentiation circuit 35). The positive input terminal of the differential amplifier 38 is grounded.

The differentiation circuit 35 is connected to the negative input terminal of the second comparator 39. The positive input terminal of the second comparator 39 is grounded.

The output side of the second comparator 39 is connected to one of the input terminals of the logical AND circuit 40 and the output of the first comparator 34 is connected to the other input terminal of the logical AND circuit 40. The logical AND circuit 40 is the output of the signal processing circuit 9 and of the synchronizing signal generating circuit 10.

FIGS. 8A–8E are timing charts showing the operation of the synchronizing signal generating circuit 10.

As the illumination spots 22a–22d of the laser beams 21a–21d successively pass through the effective light receiving area of the photodiode 6, a current of a magnitude corresponding to the intensity of light received flows through the photodiode 6 and a signal is output from the photodiode 6 (as in FIG. 6).

The signal output from the photodiode 6 (i.e. the signal at the connection between the photodiode 6 and the resistor 31) is input to the amplifier 32 and the amplified signal is then input into the positive input terminal of the first comparator 34. At the same time, the reference voltage from the reference voltage generator 33 is applied to the negative input terminal of the first comparator 34. FIG. 8A shows the input signals for the first comparator 34 (at the point (a) in FIG. 4). The signal at the positive terminal (i.e. the signal from the photodiode 6) is shown for the conditions W=P–D/4 and W≦P–D.

As shown in FIG. 8A, the reference voltage is set to a predetermined value which is sufficiently smaller than the peak value 43 (maximum value) of the amplified signal from the amplifier 32 and which is, at the same time, sufficiently greater than the minimum value of the amplified signal to accurately produce intersections points 41 and 42 between the two signals.

In the first comparator 34, the voltage of the amplified signal is compared with the reference voltage and a HIGH level signal is output during the interval in which the amplified signal is greater than the reference voltage. That is, as shown in FIG. 8B, a rectangular first comparator signal (pulse), which rises at intersection point 41 and falls at intersection point 42, is generated by the first comparator 34 and sent (at point (b) in FIG. 4) to the logical AND circuit 40.

The amplified signal from the amplifier 32 is also input to the differentiation circuit 35. In the differentiation circuit 35, the amplified signal is differentiated and inverted, and a differentiated signal such as that shown in FIG. 8C is output (at point (c) in FIG. 4). The zero intersection point 44 of the differentiated signal coincides with the peak value 43 of the amplified signal.

The differentiated signal is input into the negative input terminal of the second comparator 39. Since the positive input terminal of the second comparator 39 is attached to ground, the second comparator 39 generates a HIGH level signal in the interval during which the differentiated signal is negative. That is, as shown in FIG. 8D, the second comparator 39 generates a rectangular second comparator signal (pulse), which falls at the zero intersection point 44. In the shaded area in FIG. 8D, the second comparator signal may be either HIGH or LOW depending on subtle changes in the differentiation signal, however, since this area is outside of the interval for the generation of the synchronizing signal $H_{SYNC}$, the generation of the synchronizing signal $H_{SYNC}$ will not be affected. The second comparator signal is then input to the logical AND circuit 40.

As shown in FIG. 8E, the logical AND circuit 40, based on the first comparator signal and the second comparator signal, outputs the square-wave synchronizing signal $H_{SYNC}$, each rectangular pulse of which rises at the intersection point 41 and falls at the zero intersection point 44. A synchronizing signal $H_{SYNC}$ rectangular pulse is, for example, generated by the laser beam 21a, and is output from the signal generation circuit 9 and input into the control circuit 15. Thereafter, synchronizing signal $H_{SYNC}$ rectangular pulses are successively generated by the laser beams 21b–21d and the related synchronizing signal $H_{SYNC}$ rectangular pulses are successively input into the control circuit 15.

The operation of the control circuit 15 is described with reference to FIGS. 7A–7C.

FIG. 7A shows a schematic view of the deflection angle and the scan path of the laser beam 21a across the photoconductive surface 81. FIGS. 7B and 7C are timing charts showing the relationship between the lighting of the laser light source 3a and the generation of the synchronizing signal $H_{SYNC}$.

Since the main scan of laser beams 21b–21d are performed in the same manner and at substantially the same time as the main scan by laser beam 21a, the description for laser beams 21b–21d is omitted.

At the beginning of a main scan, the laser light source 3a is lit for a predetermined time. The predetermined time starts before and ends after the time at which the laser beam 21a passes over the synchronizing position 13 (photodiode 6). The predetermined time is determined, for example, based on the detection of the scan end position 14 for the previous main scan.

The photodiode 6 is thus activated by the laser beam 21a and the synchronizing signal $H_{SYNC}$ is output from the synchronizing signal generation circuit 10. The synchronizing signal $H_{SYNC}$ is then input into the control circuit 15.

In this embodiment, the trailing edge of the synchronizing signal $H_{SYNC}$ rectangular pulse is used by the control circuit 15 to calculate the starting position for the transfer of data by the laser beam 21a, that is, the image start position 12.

In control circuit 15, a predetermined time S, required for the laser beam 21a to scan, in the main scan direction, between the synchronizing position 13 and the image start position 12 (distance X), is set in a timer (not shown) built into control circuit 15. The timer is started when the synchronizing signal $H_{SYNC}$ is detected, that is, at the time of the trailing edge of the synchronizing signal $H_{SYNC}$ rectangular pulse, and, when the time set in the timer elapses, the laser beam 21a is at the image start position 12.

Thereafter, while the main scan continues, the laser light source 3a is modulated in accordance with the image data (not shown). The laser beam 21a scans over the image area 11 thereby forming the desired electrostatic latent image on the photoconductive surface 81.

When the polygonal mirror 5 has turned through a predetermined angle, in this case 60 degrees, the scan end position 14 is reached, the laser light source 3a is turned off, and the next main scan begins.

During the predetermined time S, the control circuit 15 also performs a sub scan by controlling the driving unit 16 to rotate the photoconductive drum 8 by an amount corresponding to four dots.

The above process continues cyclically for successive main scans and sub scans until the particular printing job is completed.

In the above embodiment, setting the parameters W, P, and D to satisfy $W \leq P-D/4$ ensures that IMIN will be less than or equal to 80% of IMAX, and an adequate reference voltage setting range may be secured between IMAX and IMIN. In this way, the respective peak values 43 for each of laser beams 21a–21d can be isolated such that the generation of the trailing edge of the synchronizing signal $H_{SYNC}$ can be performed accurately and independently for each of laser beams 21a–21d.

Also, in manufacturing the synchronizing signal generating circuit 10, since the upper limit of the width W of the photodiode 6 (that is, width W in the main scan direction satisfying $W \leq P-D/4$) is known, the width W may be chosen within a range that will not exceed the upper limit (preferably at or near P–D/4) such that commonly available photodiodes may be used.

The synchronizing signal generating circuit according to the invention can be applied to various optical multiple-scanning devices including those used for recording (writing) purposes such as laser beam printers or laser photo printers and those used for reading purposes such as bar code readers, image readers, and the like. Thus, the synchronizing signal generating circuit according to the invention provides a compact, inexpensive way to improve printing and reading accuracy in a variety of devices.

Although the structure and operation of a synchronizing signal generating circuit according to the invention has been described herein with respect to the preferred embodiment, many modifications and changes can be made without departing from the spirit and scope of the invention.

For example, in order to restrict the width of the light receiving surface of the photodiode in the main scan direction to a predetermined size, a light blocking mask, or the like, may be placed over the light receiving surface.

The present disclosure relates to subject matter contained in Japanese Patent Application No. HEI 07-274980, filed on Sep. 29, 1995, which is expressly incorporated herein by reference in its entirety.

What is claimed is:

1. A synchronizing signal generating circuit provided in an optical multiple-scanning device, said optical multiple-scanning device having a plurality of scanning light beams that scan in a predetermined direction along a scan path, said scanning light beams having an illumination spot of a diameter D along said scan path and being offset from each other by a pitch P along said scan path, said synchronizing signal generating circuit comprising:

a light receiving element that generates a light receiving element signal with a maximum output IMAX and a minimum output IMIN in response to light received from said scanning light beams, said light receiving element having a predetermined width W along said scan path such that said minimum output IMAX is less than 80% of said maximum output IMAX; and a signal processing circuit that generates a synchronizing signal in response to said light receiving element signal, said signal processing circuit comprising:
a first circuit that generates a first square-wave signal based upon said light receiving element signal; and
a second circuit that generates a second square-wave signal based upon a differential signal of said light receiving element signal, said synchronizing signal being defined by rising edges of said first square-wave signal and falling edges of said second square-wave signal.

2. The synchronizing signal generating circuit according to claim 1, wherein said synchronizing signal is comprised of rectangular pulses.

3. A synchronizing signal generating circuit provided in an optical multiple-scanning device having a plurality of scanning light beams that scan in a predetermined direction along a scan path, said scanning light beams having an illumination spot of a diameter D along said scan path and being offset from each other by a pitch P along said scan path, said synchronizing signal generating circuit comprising:

a light receiving element that generates a light receiving element signal in response to light received from said scanning light beams, said light receiving element having a predetermined width W along said scan path, wherein said width W is set in relation to said pitch P and said diameter D to satisfy an equation:

$$W \leq P-D/4; \text{ and}$$

a signal processing circuit that generates a synchronizing signal, comprised of rectangular pulses, in response to said light receiving element signal, wherein said signal processing circuit comprises:
a first circuit that generates a first square-wave signal based upon said light receiving element signal; and
a second circuit that generates a second square-wave signal based upon a differential of said light receiving element signal,
said first circuit generating said first square-wave signal upon comparing said light receiving element signal with a reference voltage signal that is set between a maximum output IMAX and a minimum output IMIN,
said second circuit generating said second square-wave signal by comparing a differential of said light receiving element signal with ground.

4. The synchronizing signal generating circuit of claim 3, wherein said synchronizing signal is defined by rising edges of said first square-wave signal and falling edges of said second square-wave signal.

5. A synchronizing signal generating circuit provided in an optical multiple-scanning device, said optical multiple-scanning device having a plurality of scanning light beams that scan in a predetermined direction along a scan path, said scanning light beams having an illumination spot of a diameter D along said scan path and being offset from each other by a pitch P along said scan path, said synchronizing signal generating circuit comprising:

a light receiving element that generates a light receiving element signal in response to light received from said scanning light beams, said light receiving element having a predetermined width W along said scan path, wherein said width W is set in relation to said pitch P and said diameter D to satisfy an equation:

$W \leq P-D/4$; and a signal processing circuit that generates a rectangular pulse synchronizing signal in response to said light receiving element signal, wherein said signal processing circuit generates a trailing edge for each rectangular pulse synchronizing signal when a differential signal of said light receiving element signal, with respect to a predetermined time, intersects a predetermined time axis.

6. The synchronizing signal generating circuit of claim 5, wherein said light receiving element comprises a photodiode.

7. The synchronizing signal processing circuit of claim 5, wherein said signal processing circuit comprises:

a first circuit that generates a first square-wave signal based upon said light receiving element signal; and a second circuit that generates a second square-wave signal based upon a differential signal of said light receiving element signal, said synchronizing signal being defined by rising edges of said first square-wave signal and falling edges of said second square-wave signal.

8. The synchronizing signal generating circuit of claim 5, wherein said light receiving element generates said light receiving element signal that varies between a maximum output IMAX and a minimum output IMIN.

9. The synchronizing signal generating circuit of claim 8, wherein said light receiving element signal varies in response to light received from said scanning light beams.

10. The synchronizing signal generating circuit of claim 9, wherein said minimum output IMIN is less than approximately 80 percent of said maximum output IMAX.

11. The synchronizing signal generating circuit of claim 8, wherein said minimum output IMIN is less than approximately 80 percent of said maximum output IMAX.

\* \* \* \* \*

UNITED STATES PATENT AND TRADEMARK OFFICE
CERTIFICATE OF CORRECTION

PATENT NO. : 5,883,657
DATED : March 16, 1999
INVENTOR(S) : T. MINAKUCHI

It is certified that error appears in the above-indentified patent and that said Letters Patent is hereby corrected as shown below:

On the cover page: Item [56], References Cited, U.S. Patent Documents, the following documents were omitted and should be included:

| | | | |
|---|---|---|---|
| --4,404,571 | 9/1983 | Kitamura | 347/235-- |
| --4,429,218 | 1/1984 | Thomas | 250/214R-- |

Signed and Sealed this

Twenty-eighth Day of March, 2000

Attest:

Q. TODD DICKINSON

*Attesting Officer*     *Commissioner of Patents and Trademarks*